Aug. 3, 1954  S. J. SINDEBAND  2,685,544
PRODUCTION OF VANADIUM CARBIDE SURFACED
WEAR-RESISTANT BODIES
Filed Jan. 17, 1951
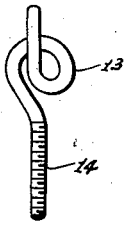
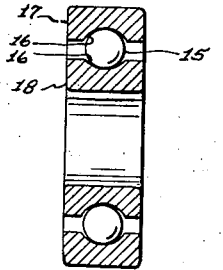
INVENTOR
S. J. SINDEBAND
BY
ATTORNEYS Patented Aug. 3, 1954

2,685,544

UNITED STATES PATENT OFFICE 2,685,544

PRODUCTION OF VANADIUM CARBIDE SURFACED WEAR-RESISTANT BODIES

Seymour J. Sindeband, Chappaqua, N. Y., assignor to Wearex Corporation, Yonkers, N. Y., a corporation of New York Application January 17, 1951, Serial No. 206,381

2 Claims. (Cl. 148—6)

This invention relates to wear-resistant bodies or articles of the type having a ferrous or steel base provided on its exterior with a hard wear-resistant continuous surface layer and to methods of producing such bodies.

Among the objects of the invention is a ferrous body or article provided with a wear-resistant continuous surface layer or casing of vanadium carbide for use in applications requiring bodies or articles having exposed surfaces which are subject to wear.

A distinct object of the invention is a provision of a ferrous body or article provided with a wear-resistant surface layer or casing of vanadium carbide having a Vickers hardness of about 1500 to 1600 or higher.

A particular object of the invention is a ferrous body or article provided with such wear-resistant vanadium surface layer on only certain surface portions thereof, with other surface portions of the article being free from such vanadium carbide surface layers.

According to the invention, a ferrous body or article having at least in the surface layer thereof at least about 0.4 percent available carbon is provided with a wear-resistant continuous surface layer of vanadium carbide having a Vickers hardness of at least about 1500 to 1600, by causing vanadium—deposited at an elevated temperature on the surface of the body—to diffuse into the surface layer of the ferrous body and to combine with the carbon content thereof to produce a wear-resistant vanadium carbide surface layer of a thickness of at least about 8 microns having such high hardness.

As used herein in the specification and claims, "Vickers hardness" means hardness in numbers determined by Vickers diamond pyramid hardness tests, such as described for instance in the Metals Handbook, 1939 edition, published by the American Society for Metals.

The foregoing and other objects of the invention will be best understood from the following description of exemplifications thereof, reference being had to the accompanying drawings wherein:

Fig. 1 is an elevational view of a conventional thread guide having a wear resistant carbide casing of the invention, and Fig. 2 is a cross-sectional view of a ball bearing having wear-resistant carbide surface regions of the invention.

For years past ferrous bodies or articles with hard wear-resisting surfaces have found many applications in the arts as for example the moving parts of machinery subject to wear and shock. Heretofore, it has been generally believed that the most satisfactory wear-resistant hard surface for a ferrous article is that provided by electrodeposition of a layer of chromium from an electrodeposition bath on the surface of the body. However, such chromium surface layer, even if formed under the most favorable conditions, exhibits at most about 800 Vickers hardness and has only a limited wear-resistance.

The present invention is based on the discovery that under certain critical conditions of a carbon content of the ferrous body and the thickness of its cross-sectional area it is possible to provide the entire or only a limited exposed surface region of such body with a wear-resistant vanadium carbide layer forming an integral part of the body and exhibiting a Vickers hardness of 1500 to 1600 or even more, thus multiplying the life of such wear-resistant bodies or articles compared to the prior art chromium coated wear-resistant bodies.

In accordance with the invention a ferrous or steel body containing at least 0.4% carbon having a certain minimum thickness in relation to its carbon content will, when subjected at an elevated temperature to a surface alloying action in which vanadium is deposited on the surface of the body, cause the deposited vanadium to diffuse into the surface layer of the body and combine with carbon migrating from the interior to form a vanadium carbide surface layer which permits continued deposition of vanadium on the exterior surface of the body, the additional deposited vanadium continuing to combine with the carbon in the surface layer until a vanadium carbide surface layer of a thickness of at least about 8 to 16 microns having at least about 1500 Vickers hardness has been formed on the surface of the body as an integral part thereof.

Important factors affecting the nature of a vanadium carbide casing formed on the surface of a ferrous article are the percentage of its carbon content, the thickness of the ferrous body in relation to its total carbon content, and the percentage of alloying elements having a greater affinity for carbon than vanadium. The ferrous or steel article should have an available carbon content of at least 0.4% and should be of substantial thickness of at least about .020 inch so that carbon of the interior can diffuse from relatively deep areas below the surface to combine with vanadium deposited on the surface of the article at an elevated temperature from a gaseous or liquid vanadium compound into a wear-resistant vanadium carbide surface layer of substantial thickness. It has been found that highly satisfactory vanadium carbide surface layers form on ferrous articles containing 0.60 to 1.20% carbon.

A feature of the invention is the discovery that—for a ferrous body having a carbon content of at least 0.4% and a certain minimum thickness—the vanadium carbide casing formed on its exterior by the treatment of the invention will increase in hardness as the thickness of the ferrous body increases until it reaches a maximum hardness which does not increase with a further increase in thickness of the ferrous body. The increase of the hardness of the vanadium carbide casing caused by the increase in the thickness of the ferrous body shows that vanadium carbides of greater carbon content and greater hardness are formed on ferrous bodies having a certain minimum thickness than in ferrous bodies of lesser thickness. In other words, in order to form on a ferrous body containing at least 0.4% carbon a vanadium carbide casing having a minimum of 1500 to 1600 Vickers hardness, the ferrous body must have a minimum thickness of at least about .020 inch so that the carbon from the interior may diffuse into the surface layer of the body on which the vanadium is deposited to provide the additional carbon required for causing the deposited vanadium to combine with the carbon of the body into a vanadium carbide layer of a minimum of at least about 1500 to 1600 Vickers hardness.

There are indications that the hardness of vanadium carbides increases with the increase of the carbon content of the carbide. Furthermore, there are indications that the hard carbide surface layer or casing of the invention of a thickness of at least about 8 microns and of at least 1500 Vickers contains or consist, at least to some extent, of a multiple carbide containing carbon combined with the deposited vanadium and with iron of the case or article.

As used herein the specification and claims the expression "vanadium carbide surface layer" and "vanadium carbide casing" are intended to mean a metal carbide surface layer or casing consisting essentially either of a carbide of the deposited vanadium or of a multiple carbide of the deposited vanadium and of iron from the article base or of a mixture or combination of such carbides.

When forming on the exterior of a ferrous body a vanadium carbide casing of the invention, the interior of the ferrous body or its core is depleted of carbon or decarburized. If such ferrous body is thin and has been depleted of its carbon content by the formation of a vanadium carbide casing on its exterior, the decarburized core of such body will lose its ability to be hardened through subsequent heat treatments of the type generally used for hardening steel bodies.

According to the invention, ferrous articles which are to be provided with a vanadium carbide casing of the invention are chosen to contain sufficient carbon and be of sufficient thickness so that—after forming on the exterior of the body the vanadium carbide casing of a minimum thickness of at least 8 microns and at least 1500 to 1600 Vickers hardness—the ferrous core of the body will retain a carbon content of at least 0.2% so that it may be subjected to known heat treatments by which similar carbon-containing steel bodies are hardened. It is thus possible to provide ferrous bodies with a wear-resistant vanadium carbide casing of the invention, which may be subjected to known heat treatment whereby the ferrous articles are given enhanced strength as well as other desired characteristics.

Among the various ferrous articles whose surfaces have been provided with a wear-resistant continuous surface layer of vanadium carbide in accordance with this invention are thread guides, cylinders, pistons, dies, drills, cutters, ball and roller bearings with associated races, phonograph needes, etc. In general, the invention may be applied to any ferrous article having a surface which is subjected to wear.

Any of the known methods for depositing vanadium from a gaseous or liquid vanadium compound on the surface of a ferrous body heated to an elevated temperature below the melting temperature of the body may be employed for depositing vanadium on and diffusing vanadium into the surface layer of the ferrous body to combine with carbon and for forming a wear-resistant surface layer of vanadium carbide.

These methods include chemical reduction or reaction of the vanadium compound at the surface of the ferrous article as exemplified by hydrogen reduction of vanadium halides and by displacement or reaction of the ferrous base metal with one of the constituents of the gaseous vanadium compound. Another method that may be used for depositing vanadium on and diffusing vanadium into the surface layer of the ferrous body to combine with carbon and for forming a wear-resistant surface layer of vanadium compound is thermal decomposition of a vanadium compound at the surface of the ferrous article as exemplified by thermal decomposition of vanadium halides at the surface of the ferrous article at high temperatures and by thermal decomposition of vanadium carbonyl at the surface of the ferrous article at low temperatures.

According to the invention, it is also possible to provide ferrous bodies or articles which have a low carbon content with a wear-resistant vanadium carbide layer by first forming on the surface thereof, by a known carburizing process, a carburized surface layer or casing of high carbon content, and thereafter subjecting the so carburized surface region to the vanadium deposition and vanadium carbide forming treatment.

In practicing the invention to produce a vanadium carbide surface on a smoothly ground polished or other mechanically worked surface of a ferrous article, it was found that surface imperfections arranged in a fashion suggesting scratches, tool marks, grinding marks, machining patterns, and/or welts appear on the exterior surface of the vanadium carbide layer. The formation of these protuberances and welts appears to occur to a lesser extent in low carbon steels. It seems that such protuberant swellings or growths appear at portions of the vanadium carbide surface layer formed on worked or work-affected surface portions of the ferrous base. As used herein in the specifications and the claims, the expression "work-affected surface portions" means surface portions of a ferrous article the material of which was worked upon as by grinding, polishing, rolling, etc., thereby giving its surface structure a characteristic distinct from underlying portions with respect to the tendency to form the vanadium carbide surface layer of the invention. It has been observed that the vanadium carbide surface layer of the invention, when formed on work-affected surfaces of a ferrous article, exhibits such objectionable surface irregularities even when the article is subjected to a heating or annealing treatment in the initial stages of or prior to the vanadium carbide forming process.

According to another phase of the invention, the objectionable surface irregularities of the wear-resistant vanadium carbide layer are eliminated, prevented or suppressed by removing the work-affected exterior surface stratum of the article before treating the article to form thereon the vanadium carbide surface layer. Any known processes, such as etching, deplating and the like which are effective in removing a surface stratum from the exterior of a ferrous body without forming a new surface of the same kind, may be used for removing the work-affected surface layer of the article so as to suppress surface irregularities on the vanadium carbide layer formed on the exterior of the ferrous article.

By way of example, the work-affected surface stratum of the ferrous article may be removed by treating the surface with a solution of HCl containing 50% by volume concentrated hydrochloric acid HCl, balance water, while heated at about 85° C. for 2 to 10 minutes. Other known etching compounds may be used for removing the work-affected surface layer from the surface portions of the article which are to be provided with the vanadium carbide wear-resistant surface layer. Alternatively, the ferrous article which has a work-affected surface may be placed in an electrolyte bath of suitable concentration and connected as anode in an electrodeposition circuit for removing the work-affected surface layer by the electro-deposition process. Any known electrolytic deposition baths may be used for this purpose such as a bath formed of a HCl solution.

For most practical applications good results are obtained with wear-resistant ferrous or steel articles provided in accordance with the invention, with a wear-resistant surface layer of vanadium carbide having a thickness of about 12 to 18 microns and up to about 25 microns or 1/1000 of an inch, although in some applications it may be desirable to provide ferrous articles with wear-resistant vanadium carbide surface layers of a thickness greater than about 25 microns.

It is possible, according to the invention, to provide only those surface portions of the ferrous article exposed to wear with the wear-resistant vanadium carbide casing. Thus, in case of the thread guide shown in Fig. 1, the spirally shaped upper guide portion is provided with the vanadium carbide surfaced layer and its threaded lower portion 14 is left untreated and without the carbide layer. Similarly, in case of the ball bearing shown in Fig. 2, only the spherical surface of the balls 15 and the race surfaces 16 of the ball races 17 and 18 are provided with the vanadium carbide layer of the invention.

Such partial surface casing may be formed by providing those surfaces on which formation of the carbide layer is to be prevented or suppressed with a stop coating or stop cover which prevents deposition of vanadium on its surface while vanadium is deposited on the wearing surfaces of the article to provide the desired vanadium carbide casing or layer. Such stop coating may consist of a coating of metal such as copper which is lower in the electromotive series than vanadium.

In a similar manner, exposed surfaces of a ferrous article of low carbon content—on which formation of a carburized layer is to be prevented or suppressed—are provided with a similar stop coating or stop cover which effectively prevents deposition of carbon on its surface while carbon is deposited by a carburizing action on the wearing surface of the article for producing thereon a surface layer of high carbon content.

By way of example, in case of the thread guide of Fig. 1, a copper stop coating is formed only on the threaded lower portion 14. In case of the bearing of Fig. 2, a copper stop coating is formed on all surfaces of the ball races 17, 18 except the two race surfaces 16.

As explained above, the ferrous article must have at least about 0.4 to 0.6% available carbon content, and a certain minimum thickness of at least about .020 inch so that the carbon diffusing from relatively deep regions below the surface may combine with the vanadium deposited at the surface for producing thereon a vanadium carbide casing having a thickness of at least about 8 microns and at least about 1500 to 1600 Vickers hardness. The critical relationship between the carbon content of the ferrous body and its thickness to the character of the vanadium carbide layer of the invention formed thereon can be shown by treating wedges of known carbon content to form on the exterior of the wedges a vanadium carbide casing of the invention in a way analogous to that described in my copending application Serial No. 206,380, filed January 17, 1951, in connection with Fig. 4 thereof. In the thin tip region of such wedge, the deposited vanadium will diffuse and become alloyed with the ferrous particles of the body, and it will have only negligible vanadium carbide content. Such thin wedge tip remains relatively soft and has the characteristics of vanadium alloyed iron.

The adjacent somewhat thicker region of such wedge will have on its exterior a thin stratum of vanadium carbide overlying a relatively thick layer of vanadium alloyed iron formed over an inner ferrous core which is substantially free of carbon, all the carbon having migrated to the surface to form with the deposited vanadium the thin vanadium carbide stratum. In the still thicker region of such wedge the vanadium deposited on the surface will have combined with the carbon that migrated from its interior into a vanadium carbide surface layer overlying the ferrous core which is substantially free from carbon. An even thicker region of the wedge will have on its exterior a vanadium carbide surface layer overlying a core containing, in addition to a ferrous particle free from carbon, carbon containing pearlite formations. Such wedge will thus have a cross-sectional region of a thickness in which the first pearlite colonies appear, the core of the wedge becoming richer in pearlite content as its cross-section increases. Only the wedge portions rich in pearlite will retain the ability of becoming hardened by known steel-hardening heat treatments.

It can also be shown that the hardness of the carbide surface layer formed on such wedge increases until it reaches a maximum of about 1500 to 1800 Vickers hardness for certain thickness of the carbon containing ferrous wedge and the hardness of the surface layer does not increase for a further increase of the thickness of the ferrous body. The desired great hardness of about 1500 to 1600 Vickers or more is reached only in the region where the casing of vanadium carbide of great carbon content is formed, the hardness leveling off and approaching the maximum for greater thickness.

As explained above, the processes of the invention involving the formation of a surface layer of vanadium carbide on a ferrous article are not limited to the displacement of the ferrous base metal with the vanadium constituent of the gaseous chromium compound. Another process for forming a surface layer of vanadium carbide on a ferrous article involves the thermal decomposition of a vanadium compound at the surface of the ferrous article. In this type of vanadium carbide surface forming treatment the vanadium compound is decomposed and vanadium deposited at surface regions of the ferrous article heated to an elevated temperature, and the deposited vanadium diffuses into the surface layer of the article and combines with carbon migrating to the surface into a vanadium carbide surface layer of substantial thickness. In such vanadium carbide surface-forming treatment the vanadium chloride gas may be passed through a retort of ceramic or like insulating refractory material containing the ferrous article. Selective induction heating of the exposed surfaces of the ferrous article—on which formation of the vanadium carbide layer is desired—may be employed to cause decomposition of the vanadium chloride gas, the deposition of vanadium at said exposed surfaces, and the formation of a surface layer of vanadium carbide on the exposed surfaces of the ferrous article.

Without thereby limiting the scope of the invention in order to enable those skilled in the art to readily practice the invention, there will now be described specific examples of satisfactory procedure for providing ferrous articles, such as thread guides in Fig. 1, with a vanadium carbide layer on its looped guide part 13.

The ferrous articles to be treated are first dipped in an acid etching bath, for example, a bath containing 50%, by volume, of concentrated HCl, at about 80° C. for 2 to 10 minutes until the work-affected exterior surface stratum has been removed from the exposed surfaces on which the wear-resistant carbide layer is to be formed. After removal from the etching bath, the ferrous articles are packed within a vanadium-chloride-producing pack mass and placed within baskets of suitable heat-resistant metal such as a vanadium-nickel-iron alloy. The pack may consist, for instance, of 50% by volume ceramic lumps, such as porcelain pieces, and the balance a vanadium alloy such as ferro-vanadium. Good results are also obtained with such pack consisting of about 20% titanium oxide by volume, the balance consisting of ferro-vanadium containing about 70% vanadium.

The treating baskets containing the ferrous metal are then placed in a retort and heated to a temperature in the range of between 900° and 1200° C. and a stream of hydrogen and hydrogen chloride gas is passed through the retort for producing reactions causing vanadium atoms to be deposited on the ferrous metal surface and to diffuse into the interior of the ferrous metal surface and combine with carbon present and/or diffusing toward the surface into a wear-resistant continuous vanadium carbide surface layer or casing.

A retort having a volume of approximately 16 cubic feet is substantially completely filled with the packed baskets. Packing material consisting of $TiO_2$, 20% by volume, the balance ferro-vanadium containing 70% vanadium is used. During the initial part of the treatment, purified dry hydrogen gas is passed through the enclosed retort space at a rate of 40 cubic feet per hour, while the temperature was raised to about 950° C., and then continued at the same rate for four hours at the same temperature of about 950° C. Thereafter, the baskets within the retort are subjected to a succession of five treatment sequences at about 950° C., each treatment sequence lasting 6 hours, and consisting of passing through the retort at a rate of 20 cubic feet per hour a mixture of 20 parts of hydrogen and 3 parts of HCl gas for one hour, followed by passing pure hydrogen at the same rate for one hour, followed by passing the same mixture of hydrogen and HCl gas as before for one hour, followed by passing pure hydrogen at the same rate for three hours. After such six treatment sequences the heat is turned off and contents of the retort are cooled to room temperature while continuing the flow of hydrogen through the retort. The carbide surfaced articles are then removed from the retort and subjected to an air blast removing adhering packing materials from them.

As described previously, ferrous bodies or articles which have a low carbon content are provided with a wear-resistant vanadium carbide layer by first forming on the surface thereof, by a known carburizing process, a carburized surface layer or casing of high carbon content, and thereafter subjecting the so carburized surface region to the vanadium deposition and vanadium carbide forming treatment.

By way of an example, the low carbon ferrous article is first packed in a conventional carburizing pack mass and placed within a carburizing furnace and heated to a temperature of about 925° C., causing carbon to be deposited on the ferrous metal surface and to diffuse into the interior of the ferrous metal surface until a carburized layer of substantial thickness containing, for example, about 0.95% carbon is formed on the surface of the article. The pack may consist, for instance, of a mixture of approximately 20% $BaCO_3$, bound to a hardwood charcoal with oil, tar, or molasses. However, any of the known alternative carburizing procedures may be used instead.

The carburized ferrous articles are etched and treated as in the previous examples to form of the carburized exterior the vanadium carbide casing.

As explained hereinbefore, after producing the vanadium carbide surfaced ferrous articles in which the core retains enough carbon to have a pearlite structure, they may be subjected to further heat treatment of the type applied to steel for imparting thereto high mechanical strength such as required by drills, cutters, and like articles. Such further heat treatment may be readily carried out without affecting the vanadium carbide surface layer previously formed on the article.

The principles of the invention described above in connection with specific exemplifications thereof, will suggest various other modifications and applications of the same. It is accordingly desired that the present invention shall not be limited to the specific exemplifications shown as described above.

I claim:

1. In the method of making articles having an exposed wear-resistant surface region consisting essentially of vanadium carbide forming an integral part of said article and constituting only a small fraction of the mass of said article, the procedure comprising the steps of providing a ferrous body having at least one exposed mechanically worked surface on a portion thereof which is at least 0.020 inch in thickness and containing adjacent the surface thereof at least 0.4% of available carbon, removing the stratum of work affected ferrous surface particles from said region, depositing vanadium on the exposed surface region of said body from a vanadium compound at an elevated temperature and causing the deposited vanadium to react with available carbon of said surface region and to produce out of an integral surface layer of said surface region a surface layer of vanadium containing carbide, and continuing said deposition of vanadium from said vanadium compound and the carbide forming reaction of the so deposited vanadium with the available carbon of said surface region until an integral vanadium containing carbide layer at least about 8 microns thick having a surface hardness of at least about 1500 Vickers hardness is integrally formed on said surface region.

2. The method of claim 1 in which a portion of the exposed surface of the ferrous article is provided with a coating to prevent the formation of metal carbide thereon prior to the deposition of the carbide forming metal.

References Cited in the file of this patent

UNITED STATES PATENTS

| Number | Name | Date |
|---|---|---|
| 1,178,551 | Stolle et al. | Apr. 11, 1916 |
| 1,497,417 | Weber | June 10, 1924 |
| 1,551,764 | Muller | Sept. 1, 1925 |
| 1,838,273 | McBride | Dec. 29, 1931 |
| 1,934,741 | Schulein | Nov. 14, 1933 |

FOREIGN PATENTS

| Number | Country | Date |
|---|---|---|
| 837,560 | France | Nov. 12, 1938 |
| 134,864 | Great Britain | Nov. 12, 1919 |